Patented May 9, 1933

1,907,982

UNITED STATES PATENT OFFICE

GEORGE D. KING, OF FORT DODGE, IOWA, ASSIGNOR TO UNITED STATES GYPSUM COMPANY, OF CHICAGO, ILLINOIS, A CORPORATION OF ILLINOIS

FOAM

No Drawing.   Application filed April 22, 1927.   Serial No. 185,921.

This invention relates to a composition of matter consisting of a foam or a foaming substance.

Foams play an important part in the manufacture of certain light weight cementitious materials. Foams ordinarily made by beating a dilute solution of soap glue, gum arabic, licorice root, or soap bark are characterized by a fluffiness, dryness, immobility and impermanence. Such a foam will pile up in dry feathery masses and will not flow to seek its own level. The foam is dry as distinguished from wet, thus the bubbles are not lubricated, from an excess of liquid phase, but rather adhere tenaciously as if held by friction instead of readily sliding over one another to seek the natural level of fluids. This probably accounts for the lack of fluidity of the foaming substance. Such a foam is seldom permanent for more than a few moments when allowed to stand in the open air. As a rule they are made by beating a dilute water solution formed from the foaming agent such as soap or glue and water.

It is the object of this invention to produce a foam or foamy substance having novel characteristics which render it more suitable for mixing with cementitious materials prior to molding into various objects than the present known foams or substances of a similar nature. This new foam may have varying degrees of lightness; varying degrees of mobility or fluidity; and may have varying degrees of permanence, which may extend over several hours, even when air exposed. The process of manufacture contains steps which are new and necessary to the production of the foam or foaming substance having the characteristics herein described. For instance, a foam produced in accordance with this invention may be made which will weigh about 20 pounds per cubic foot, will readily seek its level and which will when made and exposed to the air for several hours maintain its volume with very little, if any, separation of water or liquid.

The preferred method of producing a foam by this new method is substantially as follows: A water solution is made with the foaming agent. This solution is of a watery viscosity, and up to this point is the usual method of producing a foam solution. To this solution some thickening agent is added such as high water carrying carbohydrate which will raise the viscosity of the foam solution to that of a syrup. This strengthening agent, however, must be of such nature that the foaming is not inhibited. This composite solution of water, a foaming agent, and a thickening agent is then beaten into a foam by any convenient method, and it is advantageous to introduce a current of air or other gas into the foam solution while it is being beaten.

As an example of a foam made by this method, one half part of powdered soap bark is added to 75 parts of water and allowed to dissolve. Then in this solution is dissolved one part of a good grade of powdered Karaya gum which has a high water carrying capacity. The result is a viscous solution of a syrupy consistency. This composite solution is then beaten at a fairly high rate of speed using paddles, wire beater, etc., preferably with the introduction of air into the solution during the beating. Within certain limits the longer the solution is beaten the greater volume of foam will be produced. Ordinarily a foam so produced will have rather small cells or bubbles.

The quantities of the ingredients may be varied to give different results. If the quantity of thickening gum is increased the foam will generally be more fluid and more stable. If the amount of water alone is increased a lighter but drier and less permanent foam is produced. For instance, Karaya gum of a good grade will absorb approximately 50 to 75 parts by weight of water to one part of gum and still give a solution of a syrupy, viscous consistency. Karaya gum is one example of the class of substances known as "vegetable mucilages" which swell up on the addition of water to form thick or syrupy solutions, as distinguished from the true gums which dissolve in water without forming these thick solutions. However, if Irish moss, a less efficient thickening agent, is used, instead of Karaya gum, more will be needed, as one part of Irish moss will only absorb about twenty parts of water. Gum tragacanth is a very efficient foaming agent which may be used for producing a high density foam, although it is somewhat more expensive than Karaya gum. Also in some cases it may be necessary or desirable to use warm water in making the solution in order to obtain the full benefit of the thickening powers of the agents.

The essence of my invention is the production of a foam in a viscous or syrupy solution to yield a wet mobile foam as distinguished from a dry feathery one, which wet and mobile foam is easily and quickly miscible to a uniform dispersion in wet slurries of cement, clays and similar earthy ingredients without segregation and loss of foam structure.

Karaya gum has also the unique property of greatly increasing the bond between the paper cover sheet of gypsum plaster board and the core material. When mixed integrally with the plastic core material, the Karaya gum migrates to the surface of the paper cover sheet before the core material has set to solid form and acts as a protective coating which prevents the recalcination of the gypsum and a destruction of the board, when the board is in the highly heated drying oven. The Karaya gum also has some adhesive properties which serve to improve the bond. When Karaya is added to the plastic mixture it serves to increase the normal consistency of the mixture from 55 c. c. to about 70 c. c., thus resulting in a reduction in density of the finished board. This reduction in density serves to improve the heat insulation qualities of the board, and effects a saving in cost of materials and freight charges on the finished board.

Having thus described my invention, what I claim is:

1. A hydrous foam adapted to maintain its freely flowing cell structure in admixture with finely divided solid matter suspended in water, comprising small gas cells uniformly disposed in an aqueous powdered soap bark extraction, dissolved in and thickened viscous aqueous solution of Karaya gum.

2. The method of manufacturing a foam whereby a water solution of soap bark and Karaya gum is beaten while a current of air is introduced into the solution.

3. A hydrous foam composition comprising air, water, a foaming agent and Karaya gum.

4. A foam composition comprising water, soap bark, and Karaya gum, the composition being capable of whipping with air to a foam having a density of 10 to 20 pounds per cubic foot.

5. A foam composition comprising one half part by weight of soap bark, about 75 parts water, and one part of powdered Karaya gum.

GEORGE D. KING.